Oct. 23, 1945.  S. E. WOODBURY  2,387,379
AREA MEASURING MACHINE
Filed July 1, 1943  4 Sheets—Sheet 2
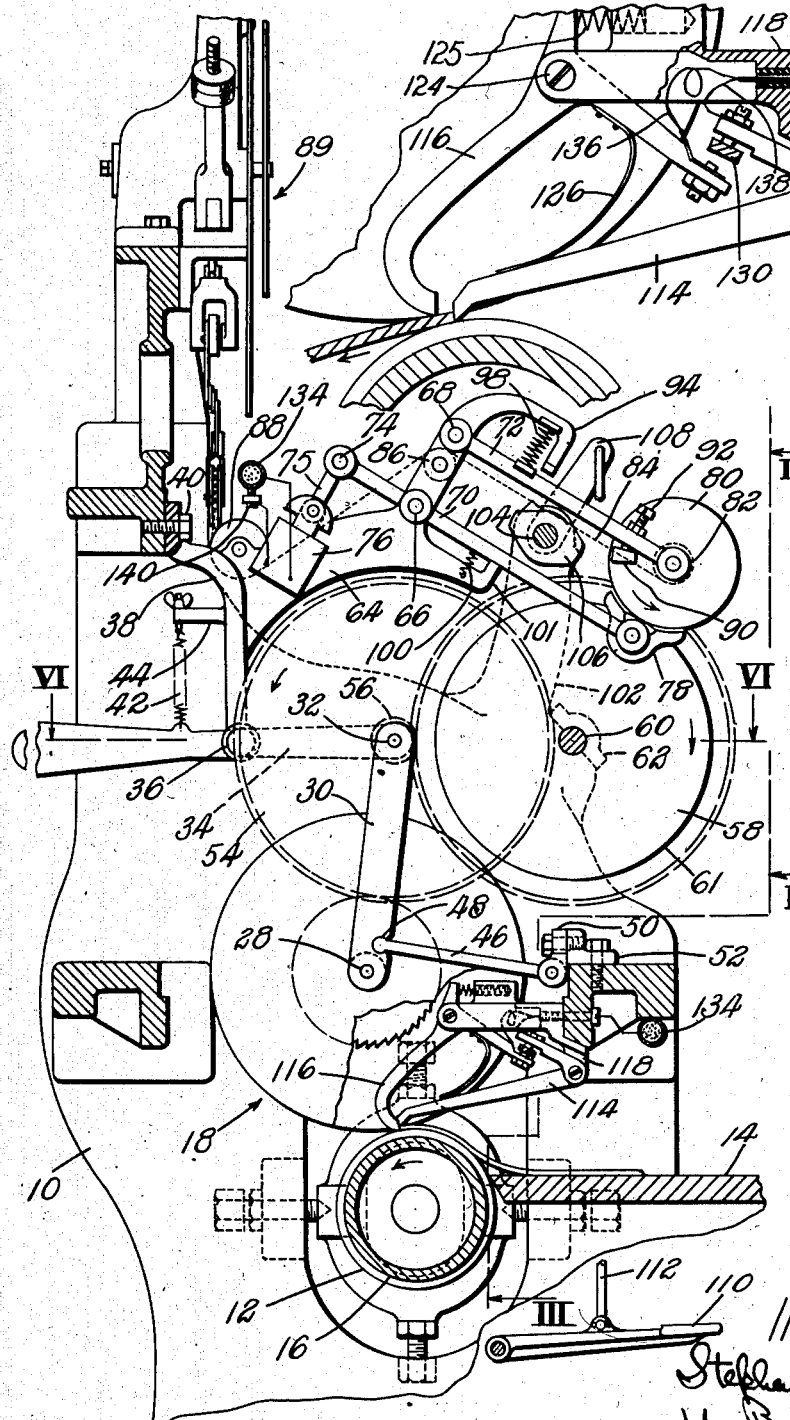
Fig. 4.
Fig. 2.
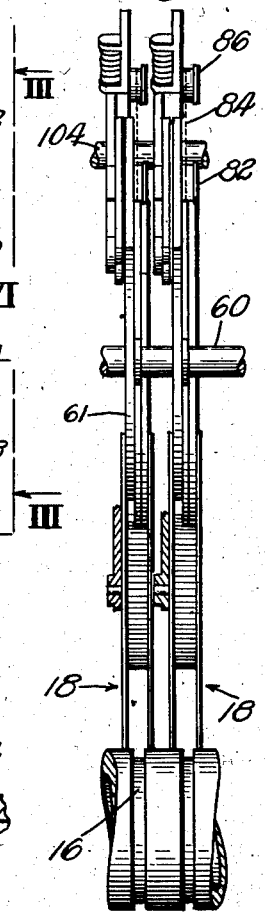
Fig. 3.
INVENTOR
Stephen E. Woodbury
By his Attorney Oct. 23, 1945.   S. E. WOODBURY   2,387,379
AREA MEASURING MACHINE
Filed July 1, 1943   4 Sheets-Sheet 4

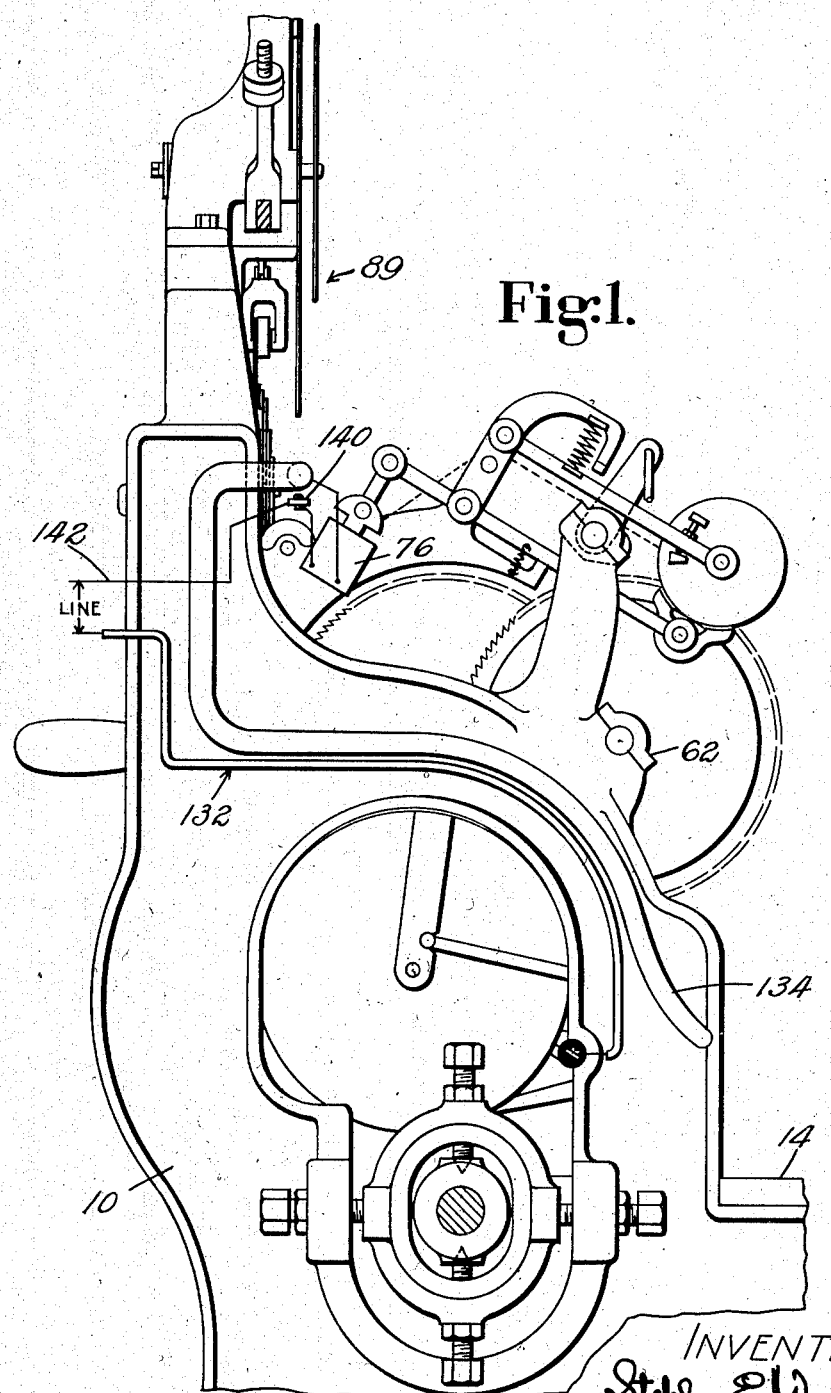

INVENTOR

Patented Oct. 23, 1945

2,387,379

UNITED STATES PATENT OFFICE 2,387,379

AREA MEASURING MACHINE

Stephen E. Woodbury, Beverly, Mass., assignor to United Shoe Machinery Corporation, Flemington, N. J., a corporation of New Jersey Application July 1, 1943, Serial No. 493,119

12 Claims. (Cl. 33—124)

This invention relates to improvements in machines of the type known as the Sawyer or Ramsdell area measuring machines which are commonly used in the area measurement of sheet material such as hides or skins.

Machines of this type are shown in the patents to W. A. Sawyer No. 286,078 and L. O. Ramsdell No. 931,144. The principle of measurement in such machines consists in dividing the hide or skin into parallel theoretical strips of constant width, measuring the length of all the strips, totalizing the lengths and transferring the result to a dial which is properly calibrated to give the area of the hide or skin. The measuring wheels are located above the bed roll which bed roll is adapted to feed the work through the machine, and the measuring wheels or other work measuring members are commonly adjusted with respect to the bed roll to accommodate pieces of work of different thickness. Such adjustment has been essential, as a variation in thickness of the work pieces measured would result in error in the measurement. Often the operator neglects to make this adjustment, with the result that in many cases the measurement is in excess of the true measurement of the pieces of work. The reason for the inaccuracy is that a thicker piece of work starts rotation of the measuring wheels or segments sooner and maintains it later than would be done by a thinner piece of work.

It is an object of this invention to provide an improved machine by which the lengths and areas of work pieces such as hides and skins may be more accurately determined regardless of the thickness of such work pieces.

To this end, and in accordance with an important feature of the invention, an independent measuring unit is provided for each theoretical strip of a work piece to be measured and each unit is under the control of keenly sensitive detector or feeler devices actuated by the strip as the work piece is passed through the machine. Another feature comprises a preferably constantly running geared and meshed set of wheels within each unit, the set being motivated by a power driven work feeding and supporting device and a work piece fed thereto and arranged to engage a work measuring means in accordance with the length of the work piece, each set being supported in large part independently of the work supporting device to effect a light tread engagement with the work piece. Still another feature is the provision of a control means including a detector or electrical contact member for initiating a measuring operation at the leading edge or face of a work piece of sheet material to be measured and the provision of a second detector or electrical contact member for terminating a measuring operation at the trailing edge or face of a work piece being measured. The first contact member will abut the end face of the work as it enters the machine and the second contact device is biased to pass substantially parallel to the face of the trailing end of the work piece as it leaves the machine. A further feature comprises brake members under the control of the detector devices to insure that the measuring devices are inoperative except as when desired. A further feature comprises a supplementary means located at the front of the machine including a cam mechanism whereby the operator, while securing or after securing a reading on a given work piece, may release the brakes and initiate the disengagement from the geared wheel sets and return of all the measuring devices to positions corresponding with the initial or zero reading position of the conventional totalizing mechanism.

These and other important features of the invention will be described in detail in the specification and pointed out in the appended claims.

In the drawings:

Fig. 1 is an elevational view of one end of a machine incorporating applicant's invention, certain portions being broken away;

Fig. 2 is a vertical section through the machine showing the operative parts as associated with one measuring unit, certain portions being broken away for purposes of clarity, and a work piece in position for the measurement to be initiated;

Fig. 3 is a front elevational view of Fig. 2 along the line III—III showing the arrangement of two adjacent measuring units and associated parts;

Fig. 4 is an enlarged detail view of the contact arms shown in Fig. 2, a portion of the work driven wheel being broken away more clearly to show the electrical connections and a work piece in position for the measurement to be terminated;

Figure 5:
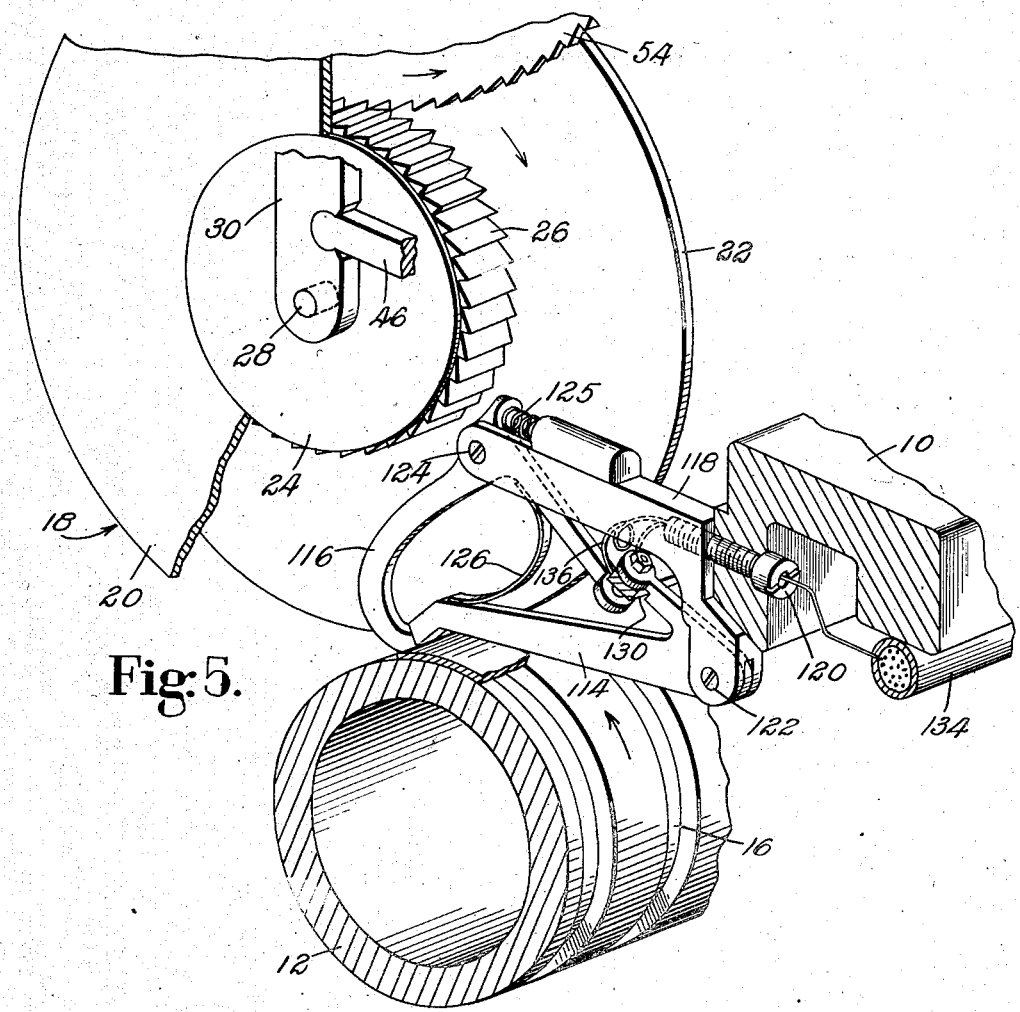
Fig. 5 is a perspective view in section of the bed roll and one work driven wheel with leather to be measured just entering the machine.
Figure 6:
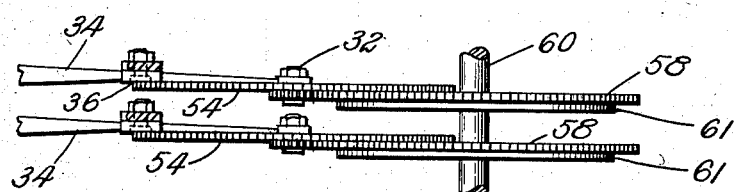
Fig. 6 is a sectional view along the line VI—VI of Fig. 2 showing the arrangement of two adjacent work driven wheels and associated parts.

As shown in Figs. 1 and 2, a main frame structure 10 is utilized upon which is suitably mounted a constantly running and power driven bed roll or work support 12, the direction of rotation being as shown by the arrow in Fig. 2. A table 14 is provided over which the operator passes a work piece to be measured into the machine and over the bed roll. The bed roll 12 is preferably provided with a series of annular channels 16 (Figs. 2, 3, 5) extending along its length, one channel corresponding to one strip of the series of strips into which the work piece is theoretically divided, this division for measuring purposes being customary in machines of this type. The structure now to be described is that associated with one measuring unit, it being understood that many such units are mounted side by side in the broadly conventional arrangement across the front of the machine, the number being such as to enable measurement of the widest work piece to be handled. Above each channel 16 is mounted a work driven wheel 18 as shown in Figs. 2, 3 and 5. Each work driven wheel 18 is composed of two disks 20 and 22 (Fig. 5) and a hub 24 having gear teeth 26 thereon. The disks 20 and 22 may be so made as to fit over the circular side portions of the hub 24 to be joined thereto by peening over the metal. The work driven wheels 18 are preferably each so mounted that they rest lightly upon the bed roll 12 although the arrangement may be altered, if desired, to limit the downward movement of the wheels 18 to give a slight clearance between them and the bed roll when no work is present. In the latter event, the wheels 18 will rotate only while work is present beneath them and sudden starting of the wheels 18 by introduction of work pieces may give satisfactory results with some types of work where possible marring is not objectionable. Each wheel 18 is mounted upon a short shaft 28 suitably held in place on a member 30, member 30 in turn being pivoted at 32 on the forward end of a lever 34 which is pivoted at 36 on a bracket member 38 fastened to the main frame 10 by bolts 40. The back end of the lever 34 is somewhat enlarged and carefully weighted so that a wheel 18 and its associated members are preferably held in position to bear very lightly upon the bed roll. A spring 42 with an adjustable lock nut and pin (Fig. 2) is dependent from an arm 44 extending rearwardly from the member 38 by means of which the effectiveness of the weighted end of the lever 34 can be varied. In order to prevent horizontal displacement of the work driven wheel 18 a bar 46 is pivotally notched at 48 into the element 30. The other end of the bar 46 is pivotally joined by means of brackets 50 and 52 to a transverse member of the main frame 10. A large gear 54 is pivoted at 32, and its teeth are preferably, and as shown, in mesh at all times with the teeth 26 of the work driven wheel hub. However, lifting of the work driven wheel 18 by a work piece may cause meshing of the gears if such an arrangement is desired. The weight of the gear 54 must also be allowed for in determining the weight of the enlarged end of lever 34. Gear 54 has a small pinion 56 constantly in engagement with the teeth of a large gear 58. Wheels or gears 18, 54 and 58 constitute meshed sets, one set for each work piece strip to be measured, i. e., one for each measuring unit. These gear sets are in close parallel arrangement and extend across the entire width of the machine. All the gears 58 are mounted to rotate freely on a single nonrotatable shaft 60, which shaft is held in place by means of members 62 located one at each side of the machine frame 10. As stated before, the wheels 18, 54 and 58 are supported in large part independently of roll 12 to preclude marring of the work pieces. The gear wheel 58 is provided with an annular shoulder 61 preferably of suitable frictional material through which disk 80 may be driven. It is to be understood that disk 80 may carry the friction material for engagement with both the shoulder 61 and a brake shoe 78. Each member 38 has a forwardly projecting arm 64 upon which are pivotally mounted at 66 and 68 two arms 70 and 72. These two arms 70 and 72, the brake shoe 78, a solenoid 76 and springs 98 and 100 are used as part of an automatic means for beginning and ending the measurement of a theoretical strip of a given work piece. Each arm 70 has a rearward extension pivotally connected at point 74 by a link 75 with a solenoid 76. The forward end of each lever 70 is provided with the pivoted brake shoe 78 adapted to bear against the periphery of a measuring disk or wheel 80 rotatably mounted on the forward end of arm 72. In the lowered position of arm 72, disk 80 may be driven by frictional contact with shoulder 61. Lifting of the disk 80 about the pivot 68 breaks the contact. The hub of disk 80 constitutes a windlass 82 about which is wound a chain 84 which passes over an idler wheel 86 and below an idler wheel 88 and thence in a conventional manner to the totalizing mechanism designated generally as 89. The disk 80 has a stop 90 thereon to limit the extent of its rotation. An adjustable stop 92 is mounted on the arm 72 to strike against the stop 90. An inverted U-shaped extension 94 of the arm 64 constitutes a stop to limit the upward movement of the arm 72. A spring 98 is held in compression between the extension 94 and the arm 72 tending to hold the arm 72 in its lowermost position. A spring 100 connected at one end to the arm 64 and attached at its opposed end to the arm 70 tends to pull the arm 70 downwardly. At each side of the machine an upwardly extending bracket arm 102 is placed on the machine frame to support a transversely extending shaft 104. For each work driven wheel 18 and its attendant parts a cam 106 is keyed or otherwise fixed to the shaft 104. At one end of the shaft 104 a lever 108 is fastened, and by means of a treadle 110 and a suitable connecting rod 112 the shaft 104 and all the cams 106 therein may be rotated for a purpose to be subsequently described. For each work driven wheel 18, contact arms 114 and 116 are provided, which arms in combination with the means for bringing wheel 58 and disk 80 into engagement, constitute a control of the measuring of a given work piece. These two arms are mounted upon a suitable bracket 118 fastened to the main frame 10 by a hollow screw 120. The arrangement is such that the arms 114 and 116 are pivoted at 122 and 124 (Fig. 5), and each arm is possessed of two extensions, one to function as an electric contact means and the other as a feeler device to contact work pieces to be measured. Both feelers or arm ends are shaped so as to operate through a small opening in a work piece, such as a hole, to omit measuring it and they operate to detect the end faces of the work piece. The arms are preferably placed above a skin to be measured because they thereby operate on the flesh side which will be the upper surface ready for marking to record the area. If desired, they may be positioned to operate on the lower side of the skin; or either of the arms and its contact means may be positioned above the skin and the other below and still serve the same purpose. The feeler ends or tips of arms 114 and 116 are very narrow, about 1/8" in width, and they may be hardened to resist wear and polished so that they will not injure the work piece surface. These feeler ends should terminate at positions in a straight line along the roll 12. The channels 16 in the bed roll are of appropriate width to receive the feeler ends or tips. A spring 125 is mounted on the bracket 118 to insure that the arm 116 is lightly held down on the bed roll 12 in the absence of a work piece thereon. The arm 114 is likewise held down by means of a spring 126 suitably fastened to the arm 116, as shown. A bus bar 130 (Fig. 5) is mounted to extend across the machine and between the contact points of the arms 114 and 116. This bus bar is connected with one side 132 of a suitable source of current (Fig. 1). A conduit 134 is supported along the front of the machine and carries insulated wires, one for each work driven wheel. Each wire leads through a hollow screw 120 from the conduit 134 and is then divided into two sections or ends 136 and 138. Wire section 136 is connected to the contact point of arm 116 and wire section 138 is connected to the contact point of arm 114. The conduit 134 extends up and along one side of the machine (Fig. 1) and then across the top. Each insulated wire leads from the contact points of one set of arms 114, 116 and passes through the conduit 134 and to the solenoid 76. A short wire leads from the solenoid to a bus bar 140, and a single wire 142 (Fig. 1) leading from the bus bar 140 to the other side of the source of current serves the solenoids associated with all the work driven wheels. It should be understood that the contact points are so mounted on the arms 114 and 116 that they are insulated therefrom.

It is to be understood that the preferred construction is as shown but that the solenoids may be arranged differently and used to bring about the engagement of the disks 80 with the wheels 58 and that springs may be used to terminate instead of initiating that engagement. In such event, lifting of the feelers or arms 114 and 116 by a work piece should energize the solenoids instead of deenergize them and the bus bar arrangement would necessarily be changed. Such a modified design would come within the spirit of this invention.

In Fig. 2 the arm 114 is shown in position as displaced by an entering work piece. This displacement breaks the electrical contact between the arm 114 and the bus bar 130 (Fig. 4) but the distance between the points of contact are too small to show in either Fig. 2 or the similar view in Fig. 7 of the drawings.

Figure 7:
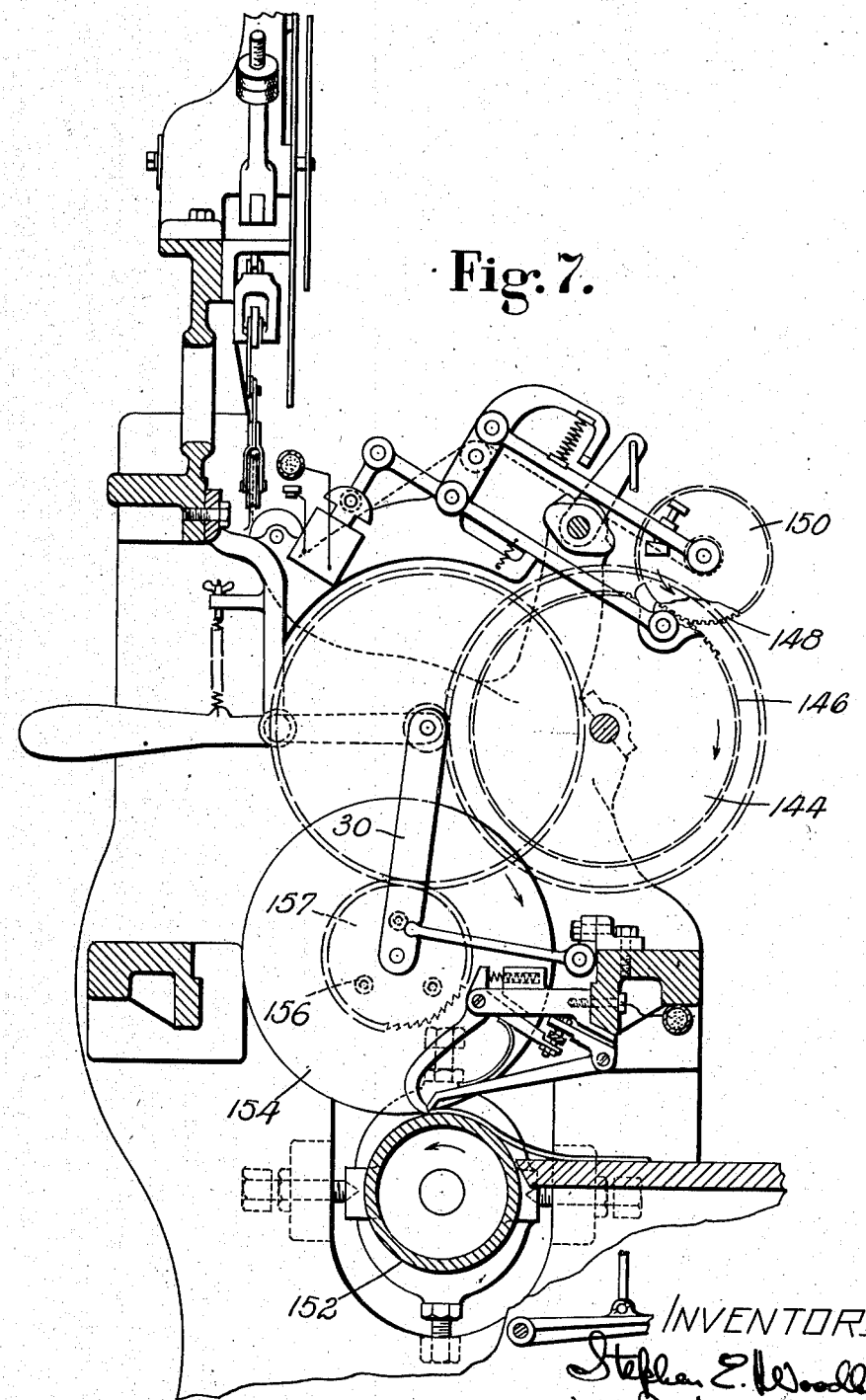
Fig. 7 is a view corresponding to that of Fig. 2 but showing a modification.

Fig. 7 shows several features which differentiate from those of Fig. 2. In order to avoid confusion, reference characters are used in Fig. 7 only for those elements which differ from those shown in Figs. 2 and 5. In place of the gear 58 with its friction material, as shown in Fig. 2, a gear 144 having small teeth 146 is utilized, these teeth being adapted to mesh with small teeth 148 on one side of the periphery of a work measuring wheel or disk 150. The other side of the disk periphery is of friction material to be engaged by the brake shoe as may be provided in the structure of Fig. 2. A bed roll 152 is provided having no channels therein and in place of work driven wheels 18, such as shown in Fig. 3, a work driven wheel 154 is used having an exterior toothed hub 157. The hub and wheel are fastened together by means of screws 156. The hub 157 is located on one side of the wheel 154 instead of being in the middle but an element 30 is pivoted to the other side of the wheel in a manner similar to that of Fig. 2. This latter construction necessitates that the electric contact arms 114 and 116 be mounted between the wheels 154, instead of within the wheels 18 as shown in Fig. 2.

To understand the operation of the device, recourse should first be had to Fig. 2 of the drawings. As that figure is viewed, a skin to be measured has been inserted from the right upon the table 14 by the operator, the feed roll 12 being constantly rotated by power means in the direction shown, serving to pull the skin through the machine and beneath the series of wheels 18. The wheels 18, having been in light contact with the bed roll before introduction of the skin, are always in motion together with the wheels 54 and 58 with the result that no problems of inertia are encountered. Prior to a skin being introduced into the machine the electric circuit for a given measuring unit is maintained by the action of the arms 114 and 116. The completed circuit energizes the solenoid 76 associated with each theoretical strip or measuring unit and thereby lifts the arms 70 and holds the disks 80 from rotating by means of the frictional brakes 78 at which time the arms 72 are held from excessive upward motion by the brackets 94 serving as stops. The arrangement is such that before beginning a measuring operation each disk 80 is in the position shown in Fig. 2 with its stop 90 against a screw 92. With all the disks 80 in that position a zero reading is obtained on a totalizing mechanism 89. The mechanism 89 is conventional and is weighted to give a continual tendency to return to its initial position, i. e., its position of zero reading. As the leading edge of a theoretical strip of the skin approaches the depending ends of the arms 114, 116 (Fig. 5) it lifts one of the wheels 18 and also the arm 114 so as to break contact with the bus bar 130 but the electric circuit for the corresponding measuring unit is still maintained by the contact of arm 116 on the bus bar 130 and no result is secured at this stage. The leading edge of the advancing skin strip next advances to the line of contact between the feed roll 12 and the work driven wheel 18. At this position any slight additional movement of the leading edge of the skin strip causes the arm 116 to separate from the bus bar 130, thereby opening the electrical circuit for that skin strip. This sets in action the means which registers the area of that strip on the totalizing mechanism 89, as will be now shown. Introduction of the skin to lift both arms 114 and 116 breaks the circuit, with the result that the corresponding solenoid is deenergized, spring 100 pulls arm 70 downwardly against stop 101, and compression spring 98 urges the periphery of disk 80 against the shoulder 61 of the wheel 58 to initiate the measuring operation for the skin strip. The chain 84 is wound about the turnstile 82 to produce its effect on the totalizing mechanism. As the trailing edge of the skin strip passes the line of contact between the roll 12 and the wheel 18 it permits the arm 114 to move into contact with the bus bar 130, thereby sharply closing the electric circuit which terminates the measurement of the ordinate or the length of the theoretical strip of the work piece and energizes the solenoid 76 to apply the brake 78 and to break engagement of the wheel 58 with the disk 80 thereby to terminate the effect on the totalizing mechanism reading. When the trailing edge of the skin strip passes away from the arm 116 it allows this arm to return into contact with the bus bar 130, but at this time without effect, since the circuit was closed previously by the arm 114. After the operator has taken the reading from the totalizing mechanism 89 which is the accumulative result of the measurement of all the theoretical strips of the skin, i. e., the area of the skin, he will operate the treadle 110 and thereby rotate all the cams 106 through an angle of about 90° from the position shown in Fig. 2. This action forces the forward ends of the levers 70 and 72 apart and the disks 80 are enabled to return to their stopped positions, i. e., the conventional totalizing mechanism 89 (usually weight operated, as before stated) is enabled to return to its initial or zero reading position. After such return, the treadle 110 is released and the cams 106 are returned to the position shown by suitable spring means (not shown) and the machine is ready for another measuring operation. It is to be understood that the ratios of gearing and the size of the disks 80 are such that the disks 80 do not rotate an entire revolution with the measurement of any skin or hide.

In the modification of Fig. 7 the manner of operation is the same as that of the machine in Fig. 2. However, the action of the machine is somewhat more positive in that the engagement of the wheel 144 and the disk 150 is through gear teeth rather than by surface friction. The teeth must be small to insure proper meshing and to avoid inaccuracy in the reading.

With the construction shown (both modifications) it should be noted that the feeler system comprising the arms 114 and 116 is such that only the middle ordinate of each strip of the work piece is measured. It should also be noted that the arms 114, 116 are so arranged that measuring of a strip starts exactly at the leading edge or face of the skin strip and stops exactly at the trailing edge or face. The means to engage the totalizing mechanism is such that the engagement is exactly in accordance with the demand of the feeler system. The brake 78 positively stops measurement exactly when it should be stopped and definitely holds the parts in the stopped position. The release for the brake will free the parts to allow measurement to begin as exactly and accurately as it was stopped. Notches, holes, and so forth in in a work piece are not included in the reading on the totalizing mechanism as they are detected by the fingers or arms 114 and 116. The connections from the work driven gear sets to the totalizing mecchanism are such that the passage of the work piece over the supporting roll may be at a changing speed or actually in reverse in direction at any time without any adverse effect on the accuracy of the final measurement. The wheels 18, 54 and 58 are not returned to any given position for a zero reading, and therefore, the same places on the wheels are not used to start measuring again. The operator may retard the middle portion of a skin as in the ordinary manner now in use without affecting the accuracy in the reading, and he may thereby effectively fold out skirt folds. Backlash is eliminated by having all measuring parts in motion before engaging the totalizing mechanism, and this eliminates the effect of inertia so that there is no delay in starting the measuring nor is there a spinning ahead at the finish of the measuring operation.

Having thus described my invention, what I claim as new and desire to secure by Letters Patent of the United States is:

1. In a machine for measuring the length of a work piece of sheet material, a power driven work feeding and supporting roll, a set of meshed and geared wheels arranged to be operated by a work piece passed in contact with the set by the roll, a measuring device mounted for movement into and out of a position to be engaged and driven by said geared wheels, and automatic means for effecting the said movement including two electrical contact devices, one contact device being adapted to detect the leading edge of the work piece as it passes over the roll to initiate the said engagement, the other contact device being adapted subsequently to detect the trailing edge of the work piece to terminate the engagement, the said automatic means being arranged to maintain the engagement of the measuring device with the geared wheels in accordance with the length of the work piece.

2. In a measuring machine for measuring sheet material, a series of parallel sets of gears, each set arranged to be independently operated by one strip of the theoretical strips of a work piece passed in contact with the series over a support, means for measuring the lengths of all the strips and arranged to be operated by engagement with the series, and automatic means for effecting the said engagement including two electrical contact devices to each set of gears, one of said contact devices being arranged to detect the leading edge of the work piece as it is passed over the support to initiate the said engagement, the other contact device being arranged to detect the trailing edge of the work piece as it is passed over the support to terminate the engagement, the said automatic means being arranged to maintain the engagement of the measuring means with the series in accordance with the area of the work piece.

3. In a machine for measuring a work piece of sheet material, a power driven work feeding and supporting roll, means arranged to be driven by a work piece and thereby measure the work piece as it is fed by said roll, and automatic means for rendering said measuring means effective including pivotally supported fingers with feeler ends terminating at positions in a straight line along the said roll and said fingers bearing electrical contact points whereby displacement of the feeler ends by the work piece as fed by the roll operates the said automatic means through the contact points.

4. In a machine for measuring the length of a work piece, a power driven work feeding and supporting roll, a set of meshed and geared wheels, the said set being supported in large part independently of the supporting roll to effect a light tread engagement with the work piece, one of said wheels bearing gear teeth on its exterior hub, said set being arranged to be operated by a work piece passed in light contact with the one wheel by the roll, a measuring device arranged to be driven by engagement with the set of geared wheels, automatic means for effecting the engagement and disengagement of said measuring device and the geared wheels including contact devices at the side of the one said wheel, said contact devices being adapted to detect the work piece as it is fed by the roll to operate the automatic means and thereby maintain the engagement in accordance with the length of the work piece, and supplementary means at the front of the machine for effecting said disengagement when desired.

5. In a measuring machine, a series of parallel sets of gears, each set being arranged to be independently operated by one strip of the theoretical strips of a work piece passed in contact with the series over a support and each set being supported in large part independently of the work support to effect a light tread engagement with the work piece, disks bearing gear teeth for measuring the lengths of all the strips and arranged to be operated by toothed engagement with the series, automatic means for effecting the toothed engagement and disengagement of said disks and the series arranged to be controlled by the work piece as passed over the support, said automatic means being adapted to maintain the toothed engagement in accordance with the lengths of the strips, and supplementary means at the front of the machine for effecting said disengagement when desired.

6. In a measuring machine, a power driven work feeding and supporting roll, a series of parallel sets of gears, each set being arranged to be driven by the roll in the absence of a work piece and to be independently operated by one strip of the theoretrical strips of a work piece when passed in contact with the series by the roll and each set being supported in large part independently of the work support to effect a light tread engagement with the work piece, means for measuring the lengths of all the strips and arranged to be operated by engagement with the series, and automatic means to effect and terminate said engagement including electrical contact members in the path of the work piece as it is passed over the supporting roll, said automatic means being arranged to maintain the engagement in accordance with the lengths of the strips, and supplementary means at the front of the machine to terminate said engagement when desired.

7. In a machine for measuring a work piece of sheet material, power driven work feeding and supporting means, means arranged to be driven by a work piece and thereby measure the area of the work piece as passed over the work supporting means, and control means for rendering said measuring means effective comprising independent sets of fingers located adjacent the work supporting means, one set being arranged to detect the thin leading edge of the work piece as it is passed over the support to initiate measurement, the other set being arranged to detect the thin trailing edge of the work piece to terminate the measurement, each set having pivotally supported feeler ends terminating at positions in a straight line along the work supporting means and bearing electrical contact points whereby displacement of the ends by the work piece being fed by the work supporting means operates the said control means through the contact points.

8. In a machine for measuring a work piece, power driven work feeding and supporting means, means arranged to be driven by the work passing over the supporting means, means for measuring the work piece and arranged to be operated by engagement with the work driven means, a solenoid operated brake for the measuring means, electrical contact members adjacent the work supporting means adapted to complete the circuit through said solenoid to apply the brake when no work piece is present on said supporting means, and a cam device arranged to release the measuring device from the work driven means and the brake.

9. In a machine for measuring sheet material, a power driven work feeding and supporting means, a measuring means arranged to be operated by a work piece being fed by said work feeding means, and a control means for said operation including a contact device to abut the end face of the work as it enters the machine to initiate the said measuring operation and a second contact device biased to pass substantially parallel to the face of the trailing end of the work piece to terminate the measuring operation as the work piece leaves the machine.

10. In a machine for measuring the area of a work piece such as a hide or skin, a transverse power driven work feeding and supporting roll, a series of independent parallel measuring units extending along the front of the machine, each unit comprising a set of geared wheels arranged to be driven by the roll in the absence of a work piece and by such work piece if such piece be fed to the machine, each unit also being provided with a means for measuring the length of the part of the work piece driving the unit and arranged to be operated by engagement with its corresponding set of geared wheels, automatic means for each unit including two electrical contact devices comprising pivotally supported fingers having feeler ends located adjacent the work supporting roll and terminating in a straight line therealong, one of said contact devices being adapted to detect the leading edge of a work piece as passed over the roll, the other contact device being adapted to detect the trailing edge of the work piece as it is passed over the roll, the said automatic means also including a solenoid-operated brake and means for moving the measuring means into and out of engagement with its geared wheels, said automatic means being arranged to immobilize its corresponding measuring means before and after the said part of the work piece drives the unit, the measuring means of all the units being connected to a weighted totalizing mechanism to secure the area of the work piece, and a cam device arranged to release all the measuring devices from their associated brakes and geared wheels to permit the weighted totalizing mechanism to return to its initial position preparatory to reception of the next work piece into the machine.

11. In a machine for measuring the area of a work piece such as a hide or skin, a power driven work feeding and supporting roll, a series of parallel measuring units extending along the front of the machine, each unit being arranged to be independently driven by a work piece passed over the roll and including two electrical contact devices located adjacent the roll to detect the presence of a work piece thereon, a set of geared wheels to be driven by said work piece, a measuring disk, means for bringing the disk into engagement with the set of geared wheels, a solenoid-operated brake for the said disk, the said means and brake being arranged to be operated by the contact devices, all of the units having a common cam device to release all the measuring disks from the sets of geared wheels and the brakes, and a weighted totalizing mechanism operatively connected to all the measuring disks.

12. In a measuring machine for measuring sheet material, a series of parallel sets of gears, each set arranged to be independently operated by one strip of the theoretical strips of a work piece passed in contact with the series over a support, means for measuring the lengths of all the strips and arranged to be operated by engagement with the series, means for mounting the measuring means in yielding engagement with the series, and two electrical contact devices to each set of gears, one of said contact devices being arranged to detect the leading end face of the work piece as it passes over the support, the other contact device being arranged to detect the trailing end face of the work piece, and electrical means arranged to be operated by the said contact devices to interrupt the said yielding engagement in accordance with the area of the work piece.

STEPHEN E. WOODBURY.